(No Model.)
R. EICKEMEYER.
DEVICE FOR MEASURING THE INTENSITY OF MAGNETIC CURRENTS.
No. 434,558. Patented Aug. 19, 1890.
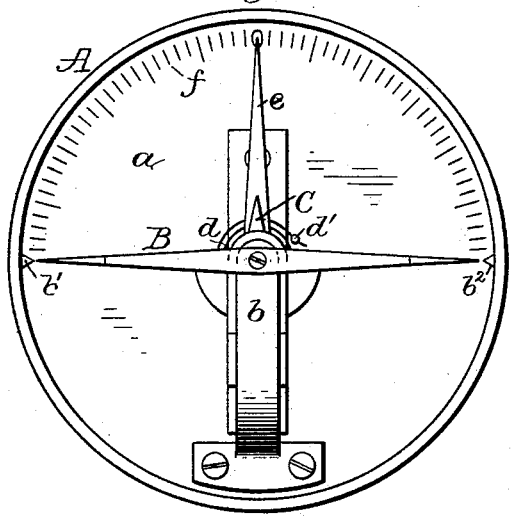
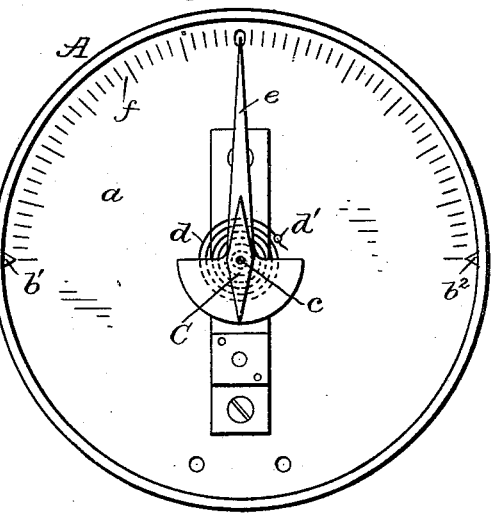
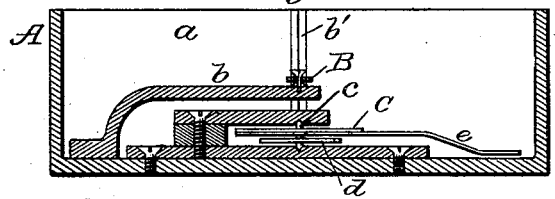
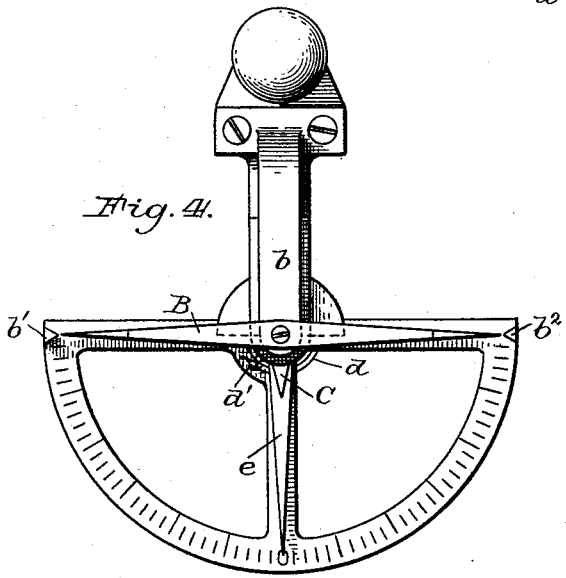
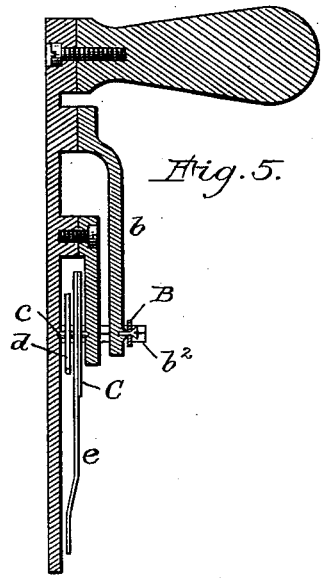
Attest:
Philip F. Larner.
Howell Battle.
Inventor:
Rudolf Eickemeyer
By M. C. Snow
Attorney.

UNITED STATES PATENT OFFICE.

RUDOLF EICKEMEYER, OF YONKERS, NEW YORK.

DEVICE FOR MEASURING THE INTENSITY OF MAGNETIC CURRENTS.

SPECIFICATION forming part of Letters Patent No. 434,558, dated August 19, 1890.

Application filed December 23, 1889. Serial No. 334,667. (No model.)

*To all whom it may concern:*

Be it known that I, RUDOLF EICKEMEYER, of Yonkers, in the county of Westchester and State of New York, have invented a certain new and useful Device for Measuring the Intensity or Strength of Magnetic Currents; and I do hereby declare that the following specification, taken in connection with the drawings furnished and forming a part of the same, is a clear, true, and complete description of my invention.

My said magnetic measuring device will be found useful in various connections, but its prime value will be realized in the exploration of such external magnetic fields as are adjacent to and surround dynamo-electric machines, with a view to not only, as heretofore, determining the direction of exterior magnetic lines of force, but also for measuring their strength or intensity, and thereby ascertaining the extent of magnetic leakage.

My device includes as an essential element an adjusting-pointer consisting of a needle, in whole or in part composed of iron, which, as in a "magnetoscope," indicates the direction of the magnetic lines to which it may be exposed, this being necessary in order that the instrument may in each instance of use be so located and adjusted that the magnetic lines may operate to their fullest capacity upon a measuring-needle. This measuring-needle has its axis or pivot substantially coincident with the axis of the adjusting-pointer, and it is composed in whole or in part of iron, and is maintained in its normal position by a coiled spring after the manner of the needle and spring in some forms of galvanometers. In one form of my device these two needles, one above the other, are mounted in a suitable box or case provided with one or two adjusting-marks, with which one or both ends or tips of the adjusting-pointer should be made to register when in service for indicating the proper location and adjustment of the instrument with reference to the magnetic current to be measured. When thus adjusted the normal position of the measuring-needle is at right angles to the adjusting needle or pointer, and the measuring-needle is deflected to the one side or the other in proportion to the strength of the magnetic current, which in each instance causes the measuring-needle to approach the line occupied by the adjusting-pointer, until the deflecting power of the magnetic current is balanced by the force of the spring. If the box or case be provided only with the adjusting-marks and with a zero-mark for indicating the normal position of the measuring-needle, the instrument may be employed with more satisfactory measuring results than those heretofore attainable by observing the effect of shaking or vibrating the needle of a magnetoscope; but I provide for securing more accurate and better defined results by the use of a graduated scale, which may be traversed by the measuring-needle or by the tip of a finger attached to the measuring-needle. The use of a box or case is not, however, essential, as will be hereinafter indicated.

To more particularly described my invention, I will refer to the accompanying drawings, in which—

Figures 1 and 2 illustrate one form of my novel magnetic measuring devices, respectively, in plan view and diametrical section. Fig. 3 is a plan view of the same without the adjusting-pointer and its bracket. Figs. 4 and 5 in plan view and section illustrate one of my devices in a modified form.

The box or case A of Figs. 1, 2, and 3 is composed of non-magnetic material, and however its exterior form may be varied it is provided with a circular recess $a$, which is preferably provided with a glass cover.

The adjusting-pointer B is a needle, which may be wholly composed of iron, but is preferably composed mainly of aluminum and provided with suitable small quantities of iron at its tips or ends, and it is well balanced upon an axial pivot consisting of a conical bearing and a pin conical at the under side of its head, the whole being mounted upon a bracket $b$, secured to the bottom of the case. The pointer thus mounted is not only free to rotate around said pin, but it is also free to tilt upon its conical bearing in planes at right angles to the bottom of the case. The function of this needle or pointer being that of an "adjuster" for enabling the instrument to be properly located and adjusted with reference to the magnetic lines or currents to be measured, the wall or side of the box is provided with one or two adjusting-marks $b'$ $b^2$, which may be inwardly-projecting points, as shown; or mere scores or marks may be relied upon for readily indicating that the instrument has been properly adjusted whenever this pointer is so under magnetic control as to be maintained in a position parallel with the magnetic lines and with its tips coincident with said adjusting-marks, it being then desirable that the bottom of the box should be substantially parallel with the pointer.

The measuring-needle C is much shorter than the adjusting-pointer and is composed of iron, and it is mounted upon a pivot $c$, which is below and coincident with the pivot of the adjusting-pointer, and has its bearing in a bracket secured to the bottom of the box.

A light coiled spring $d$, secured at one of its ends to a fixed stud $d'$ and at its other end to the measuring-needle, or to its pivot, or to a finger attached to said needle, as the case may be, serves to maintain the measuring-needle in its normal position, or, in other words, at zero, the needle then standing in a line at right angles to a line extending from one adjusting-mark to the other.

The measuring-needle is of course liable to be moved in either direction from its normal position as soon as it is located within any magnetic field, and however much it may be moved it will only conform to the already assumed position of the adjusting-pointer so far as the power of the spring has been for the time overcome, thus in each instance affording a measure of magnetic energy in the field, and the distance between the point of the needle after being thus moved and the normal position of said point affords an optical indication of magnet energy, or, in other words, the strength or intensity of the magnetic current. Approximately desirable results can be obtained by the use of the measuring-needle without any graduated scale; but if a scale were applied adjacent to so short a needle as the one shown the arc of the circle would be so small as to afford too little space for numerous and easily-read graduations, and hence the measuring-needle is provided with a long finger $e$, preferably composed of aluminum and well balanced, as shown, and said finger sweeps at its tip over a graduated scale $f$ on the bottom of the box. Upon this scale the zero-mark, as before stated, is located at a point opposite the finger-tip of the measuring-needle when the latter is in its normal position, and at either side thereof said finger has a range of ninety degrees to the one or the other of the two adjusting-marks $b'$ $b^2$.

The instrument may be calibrated as follows, viz: A field of force is developed by an iron core, a proper electric current and suitable coils affording a certain known number of lines of force per square inch. The instrument is placed in this field in such position that the adjusting-needle will be as nearly parallel as possible with the magnetic lines, and also in line with the adjusting-points $b$ $b'$. The measuring-needle will then stand deflected from its normal position proportionate to the strength or density of the magnetic field, and the position of its point will be marked on the scale for indicating the number of lines per square inch in that field. The electric current is then increased for securing a proportionate increase in the number of magnetic lines within the same area, and the consequent further deflection of the needle is then noted and marked upon the scale-plate, and so on until the measuring capacity of the instrument has been reached.

It is obvious that the measuring-needle may be restricted to movement from the zero-point in one direction only, if desired; but I prefer to have the needle free to move in either direction in response to the magnetic influences.

In Figs. 3 and 4 I show one of my devices in which the box or case is dispensed with, the scale-plate being connected with the base of the lower bracket, the adjusting-pointer B, and measuring-needle C, with its spring and its finger $e$, being as before described. The adjusting-points $b'$ $b^2$ in this instance are two posts appropriately located upon the scale-plate, and the instrument is provided with a suitable handle, which may stand rectangular to the base-plate, as shown, or it may extend rearward in a plane parallel with the base.

In some instances, as when measuring very strong currents, it will be desirable to shunt a portion of the magnetic current around the instrument; but that would involve no departure from my invention.

Having thus described my invention, I claim as new and desire to secure by Letters Patent—

1. A magnetic current-measuring device containing a pivoted measuring-needle normally controlled by a spring and a pivoted adjusting pointer or needle which will freely conform to the direction of magnetic lines and enable the measuring-needle to be properly located in and adjusted with reference to any magnetic current to be measured, whereby said measuring-needle will be deflected in proportion to the capacity of the current to overcome the power of the spring.

2. In a device for measuring the strength or intensity of magnetic currents, the combination, substantially as hereinbefore described, of a pivoted measuring-needle normally maintained at its zero position by a spring, but adapted to be deflected by magnetic currents in proportion to their capacity for overcoming the power of the spring, and a pivoted adjusting pointer or needle which is free to promptly conform to the direction of magnetic lines, said needles being mounted in a box or case provided with a zero-mark for the measuring-needle, and also with adjusting-marks which, when in line with the tips of the pointer, correctly locate the zero-mark of the measuring-needle.

3. In a device for measuring the strength or intensity of magnetic currents, the combination, substantially as hereinbefore described, of a pivoted measuring-needle normally maintained at its zero-point by a spring, but capable of deflection by magnetic currents, a pivoted adjusting-pointer free to conform to the direction of magnetic lines or currents, a graduated scale for the measuring-needle, and one or two adjusting-marks which, when coincident with the tips of the pointer, assures the proper location of the zero-point.

RUDOLF EICKEMEYER.

Witnesses:
JAMES S. FITCH,
WM. C. WOOD.